United States Patent
Spoto et al.

[11] Patent Number: 5,836,606
[45] Date of Patent: Nov. 17, 1998

[54] PAYLOAD DEPENDENT STABILIZER SYSTEM

[75] Inventors: Louis M. Spoto, Sleepy Hollow; Kenneth H. Dorman, Carol Stream, both of Ill.

[73] Assignee: Illinois Tool Works Inc., Glenview, Ill.

[21] Appl. No.: 896,445

[22] Filed: Jul. 18, 1997

Related U.S. Application Data

[62] Division of Ser. No. 689,936, Oct. 2, 1996.

[51] Int. Cl.$^6$ .................................................... B60G 11/02
[52] U.S. Cl. ......................... 280/718; 280/840; 280/689; 280/104; 280/772; 267/271
[58] Field of Search .................................... 280/718, 840, 280/689, 104, 772, 670, 688; 267/271

[56] References Cited

U.S. PATENT DOCUMENTS

| | | |
|---|---|---|
| 1,223,486 | 4/1917 | Forstrom . |
| 2,840,387 | 6/1958 | Orlandi . |
| 2,950,122 | 8/1960 | Erickson . |
| 2,969,246 | 1/1961 | Erickson . |
| 3,459,436 | 8/1969 | Rusconi . |
| 4,570,970 | 2/1986 | Burfiend . |
| 4,633,564 | 1/1987 | Sauber . |
| 4,671,535 | 6/1987 | Hanson et al. . |
| 4,872,653 | 10/1989 | Chuchua .............................. 280/718 X |
| 5,172,930 | 12/1992 | Boye et al. .............................. 280/718 |
| 5,215,329 | 6/1993 | Santo . |
| 5,382,034 | 1/1995 | Parker et al. . |
| 5,505,479 | 4/1996 | Lee . |
| 5,542,705 | 8/1996 | Parker et al. . |
| 5,580,089 | 12/1996 | Kolka . |

*Primary Examiner*—Christopher P. Ellis
*Attorney, Agent, or Firm*—Schwartz & Weinrieb

[57] ABSTRACT

A stabilizer system is designed for an automotive vehicle having a rear suspension including left and right shackles, each having a first end coupled at a first pivot point to a respective one of the left and right frame members and a second end spaced from the first end and pivotally coupled to one end of a leaf spring. The stabilizer system comprises first and second elongated arms, each of the arms being rigidly coupled to one of the shackles and extending transversely thereof. First and second elongate flexible members tensionably link the arms, the first elongate flexible member being operatively connected to and extending between a first end of the first arm and a second end of the second arm, and the second elongate flexible member being operatively connected to and extending between a first end of the second arm and a second end of the first arm. Each of the elongate flexible members passes over both of the frame members between its operative connections to the respective first and second arms.

21 Claims, 3 Drawing Sheets

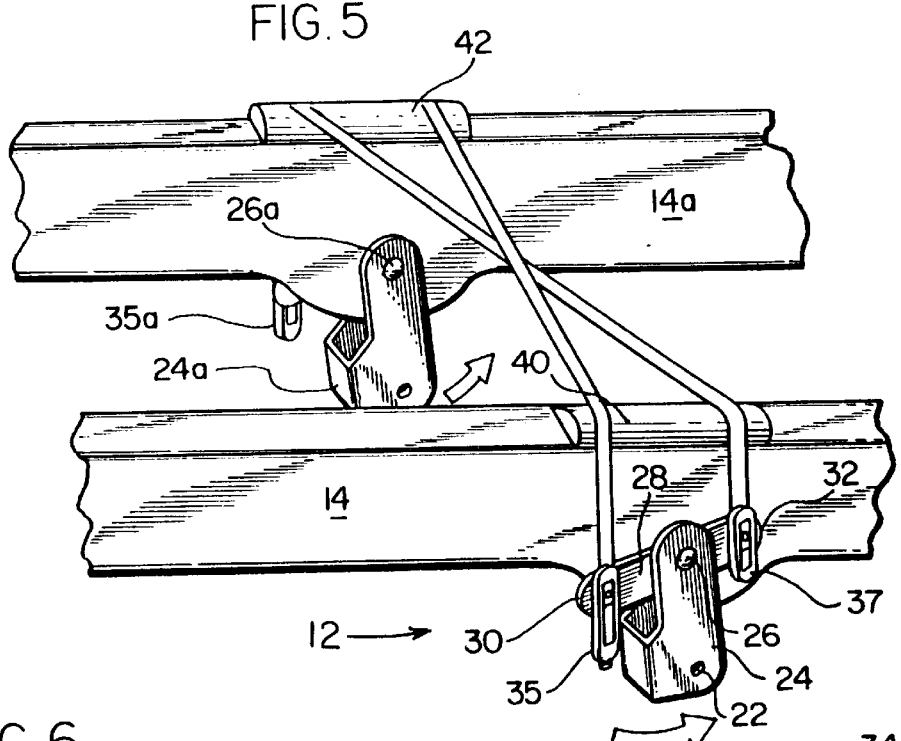
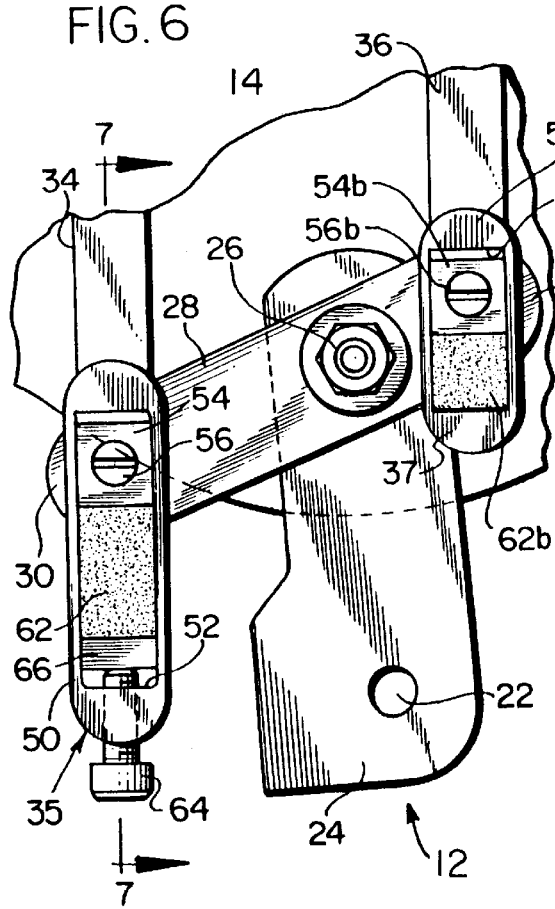
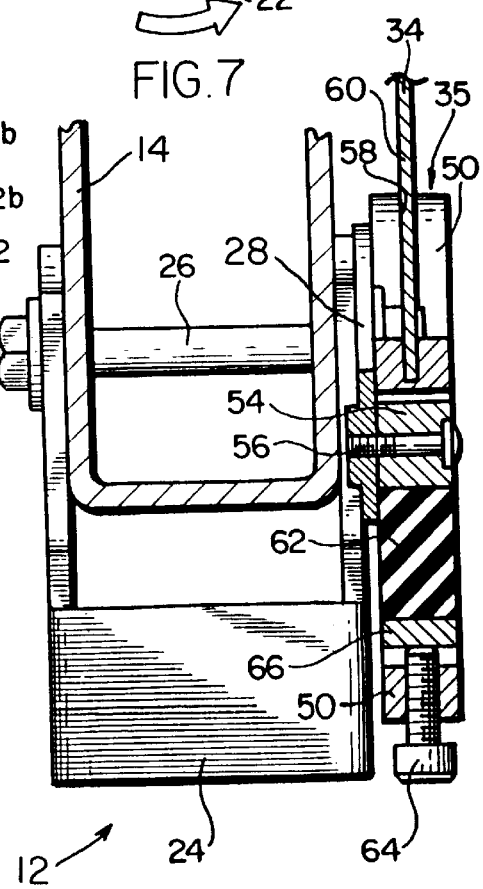

PAYLOAD DEPENDENT STABILIZER SYSTEM

This patent application is a Divisional patent application of prior patent application Ser. No. 08/689,936 filed Oct. 2, 1996.

FIELD OF THE INVENTION

The present invention relates to a stabilizer system for use with an automotive vehicle. More particularly, the invention relates to a stabilizer system which will help to control vehicle understeer/oversteer characteristics over the vehicle's payload range.

BACKGROUND OF THE INVENTION

Many arrangements for controlling vehicle understeer or oversteer have been proposed. Such suspensions often include such elements as anti-roll bars or stabilizer bars to help control vehicle body roll during turning maneuvers. Such anti-roll bars generally work by transferring vehicle weight from the inside wheel to the outside wheel during a turn. However, the anti-roll bar is a fixed element, and only comes into play during turning.

Generally speaking, the terms oversteer and understeer are used herein to refer to the following situations. In an understeer condition, the vehicle does not turn as sharply as expected in response to turning of the steering wheel. This generally occurs when there is insufficient traction in the front tires of the vehicle to follow the turning radius dictated by the position of the steering wheel. However, such understeering is generally relatively easy for most drivers to compensate for and tends to occur relatively slowly during a turn, rather than as a quick and unexpected movement of the vehicle.

On the other hand, oversteer occurs when the vehicle turns more sharply than expected. Such an oversteer condition usually occurs due to a loss of traction of the rear tires, causing the rear end to "slide out", thus turning the front end of the vehicle relatively sharply and unexpectedly. Such an oversteer condition is generally more difficult for most drivers to control or compensate for and can cause relatively rapid and unexpected deviation of the vehicle from the direction set by the steering wheel.

A related phenomenon is that of dive-lift, wherein the front end of the vehicle tends to dive forward during braking. Such diving generally leads to lift, and loss of traction in the rear wheels, which compromises braking performance.

The rolling motion of the vehicle during a turn can also cause a lessening of the weight on the inside tire and a transfer of this weight to the outside tire. However, the gripping characteristics of tires are such that above a certain point, increased weight tends to decrease gripping ability. Thus, vehicle roll can also contribute to understeer and oversteer conditions.

While the present invention may find utility in other vehicles, the payload range provided in most passenger vehicles is not as broad as the payload range which is normally provided in light trucks such as pickup trucks. Some other utility vehicles, vans, and the like are also designed to have relatively broad payload ranges as compared to ordinary passenger vehicles.

Generally speaking, such light trucks and other similar vehicles are designed to avoid an oversteer situation, even in a fully loaded condition. However, in a truck or similar vehicle wherein the payload is primarily over the rear wheels, increased loading tends to increase oversteer tendencies of the vehicle. Thus, when the vehicle is in a relatively lightly loaded or unloaded condition, this design for avoiding oversteer will result in increasing amounts of understeer of the vehicle.

However, the majority of buyers of light trucks and similar vehicles today do not use the vehicles for heavy hauling, and thus rarely if ever load the vehicle to its full payload capacity. Most often, the vehicles are used for sports and utility functions and are lightly loaded or unloaded with respect to their rear payload areas. Thus, such vehicles tend to experience marked understeering under most conditions encountered by such users.

Another requirement of any suspension system, or of any addition to a suspension system, is that additional weight be minimized. However, typical anti-roll bars or stabilizer bars may weigh approximately 20 lbs. or more, and as mentioned above, do not compensate in any way for differences in vehicle payload. Moreover, anti-roll bars are sensitive to single wheel impact or bumps. That is, when a single wheel of the suspension is impacted, an anti-roll bar will transfer its load to the body of the vehicle, causing a less comfortable ride. Thus, there is room for improvement over the anti-roll or stabilizer bar.

One particularly novel and useful stabilizing system is shown in U.S. Pat. No. 5,382,034 which is commonly assigned herewith. However, this system acts by transferring forces to the vehicle frame, whereas the present invention, as will be more fully described hereinbelow, advantageously operates by distributing forces in such a way that the suspension members tend to be compensated for forces experienced during turning, braking, and the like. Moreover, the stabilizer of the present invention is payload dependent, such that it will allow the vehicle's suspension to accomplish a desired amount of understeer, in accordance with vehicle design criteria, when the vehicle is at or near its fully loaded condition, and yet come into play to counteract increased understeer conditions as the vehicle load decreases.

OBJECTS OF THE INVENTION

It is a general object of the invention to provide a novel and improved stabilizing system for use with a vehicle suspension.

A more specific object is to provide such a stabilizing system which is payload dependent, permitting vehicle handling characteristics in a full payload situation in accordance with vehicle design, and coming into play as the payload decreases to avoid excessive understeer.

A related object is to provide such a stabilizing system which adds but a minimum amount of weight to the vehicle and its suspension.

Another related object is to provide such a stabilizing system which is relatively simple and inexpensive to manufacture and assemble.

SUMMARY OF THE INVENTION

Briefly, and in accordance with the foregoing, the invention provides a stabilizer system for an automotive vehicle having a rear suspension including left and right shackles, each having a first end pivotally coupled at a first pivot point to the corresponding one of left and a right frame members and a second end spaced from the first end and pivotally coupled to one end of a leaf spring, the stabilizer system comprising first and second elongated arms, each of the arms being rigidly coupled to one of the shackles and extending transversely thereof; first and second elongate flexible means for tensionably linking the arms, the first elongate flexible means being operatively connected to and extending between the one end of the first arm and the opposite end of the second arm, and the second elongate flexible means being operatively connected to and extending between the one end of the second arm and the opposite end of the first arm, each of the elongate flexible means passing over both of the frame members between its operative connections to the respective first and second arms.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements throughout the several views, and in which:

FIG. 5 is a view similar to FIGS. 2 and 4 showing operation of the invention for preventing anti-dive control;

FIG. 6 is a partial elevation showing further details of a portion of FIG. 5; and FIG. 7 is a sectional view taken generally along the line 7—7 of FIG. 6.

DETAILED DESCRIPTION OF THE ILLUSTRATED EMBODIMENT

Figure 1:
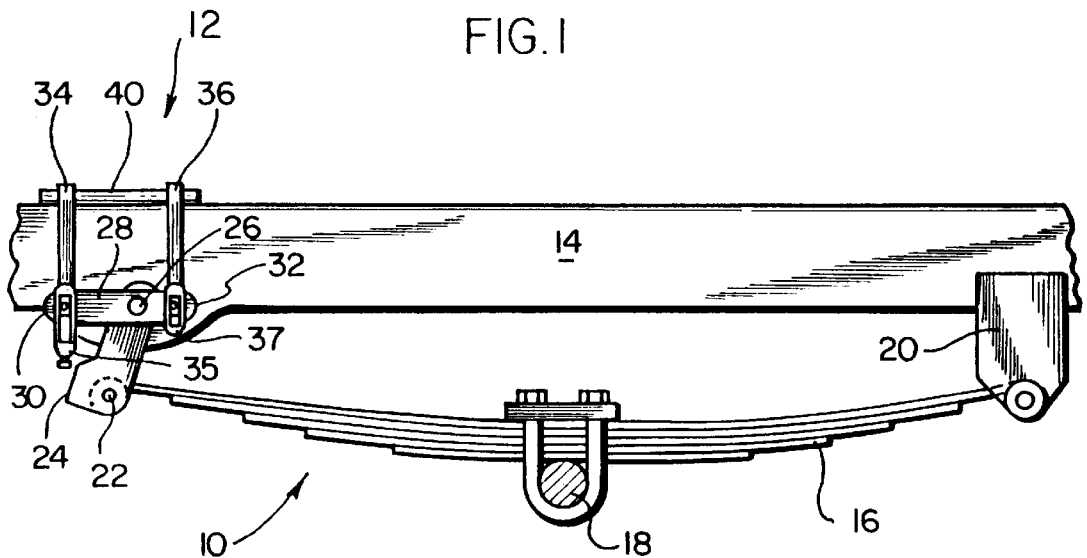
FIG. 1 is a side elevation of a portion of a vehicle rear suspension system in connection with which the invention is advantageously employed.

Referring now to the drawings and initially to FIG. 1, there is shown a relevant portion of a vehicle suspension 10, in connection with which a stabilizer apparatus 12 in accordance with the invention is advantageously utilized. Only a portion of the stabilizer system 12 is visible in the view of FIG. 1. FIG. 1 illustrates a portion of a beam-like structural member or frame member 14 of the vehicle to which a leaf spring 16 of the suspension is operatively coupled. The leaf spring 16 in turn is coupled with an axle 18 in conventional fashion.

In accordance with conventional practice, one end of the leaf spring 16 is pivotally coupled to a suitable coupling structure, such as an ear 20, which projects downwardly from and is pivotally coupled to the structural member 14. An opposite end of the leaf spring 16 is pivotally coupled with a coupling point 22 on a shackle 24, which is in turn pivotally coupled at a second coupling point or pivot point 26 to the structural member 14. Thus, the shackle 24 generally comprises an elongated member having a first pivot point 22 at one end thereof which is coupled to the leaf spring 16, and a second pivot point 26 located near an end thereof opposite the pivot point 22 and connected to the vehicle frame member 14.

In accordance with the invention, an elongate arm 28 is coupled to the shackle 24. The elongate arm 28 extends transversely across the shackle 24 and, in the illustrated embodiment, at an angle somewhat removed from a right angle to an axis of the shackle which is defined longitudinally, generally running between the two pivot points 22 and 26. In the illustrated embodiment, the elongated arm 28 is coupled with the shackle 24 in an off-center or offset condition, with respect to the first pivot point 26. This relative off-center mounting of the arm 28 and shackle 24 results in the payload dependent characteristics of this embodiment, which are described further hereinbelow. However, it is within the scope of the invention to mount the arm centered about the pivot point 26. In this latter configuration, the structure of the invention acts as a light weight stabilizer system, but without the below-described payload dependent feature. In the illustrated embodiment, the arm 28 extends across the pivot point 26, however, the arm may be mounted elsewhere relative to the longitudinal axis of the shackle 24 without departing from the invention.

Figure 3:
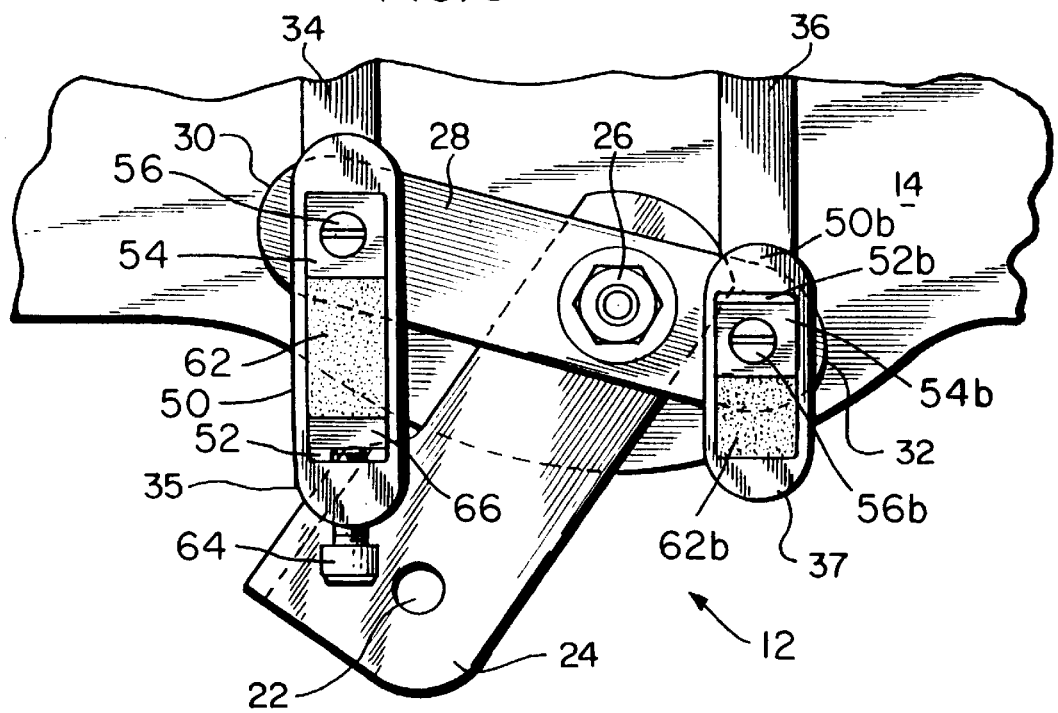
FIG. 3 is an enlarged elevation showing further details of a portion of FIG. 2.

As best viewed in FIG. 3, the off-center or offset mounting of the elongate arm 28 is such that a first end 30 of the arm 28 extends further from the first pivot point 26 than the second or opposite end 32 of the arm 28. A first strap 34 is coupled to the first end 30 of the arm 28 and a second similar strap 36 is similarly coupled to the opposite end 32 of the arm 28. The straps 34 and 36 may be coupled with the respective ends 30 and 32 of the arm 28 in a variety of ways. Other elongate flexible members, such as cables or the like, may be utilized in the same fashion as the illustrated straps, without departing from the invention.

As will be more fully described later herein, preferably the form of coupling utilized provides a resiliently tensionable coupling structure 35, 37 between the straps 34, 36 and the arm 28 so as to partially relieve sudden tension forces applied to the respective straps 34 and 36 in operation. The illustrated embodiment uses one form of coupling structure, it being understood that other structures may be utilized consistent with the foregoing considerations without departing from the invention. Moreover, in selecting the material of the straps 34, 36, a sufficiently elastically resilient material might be utilized to obviate the requirement for a resiliently tensionable coupling arrangement. However, in the illustrated embodiment the straps are a flat ribbon-like banding material.

Figure 2:
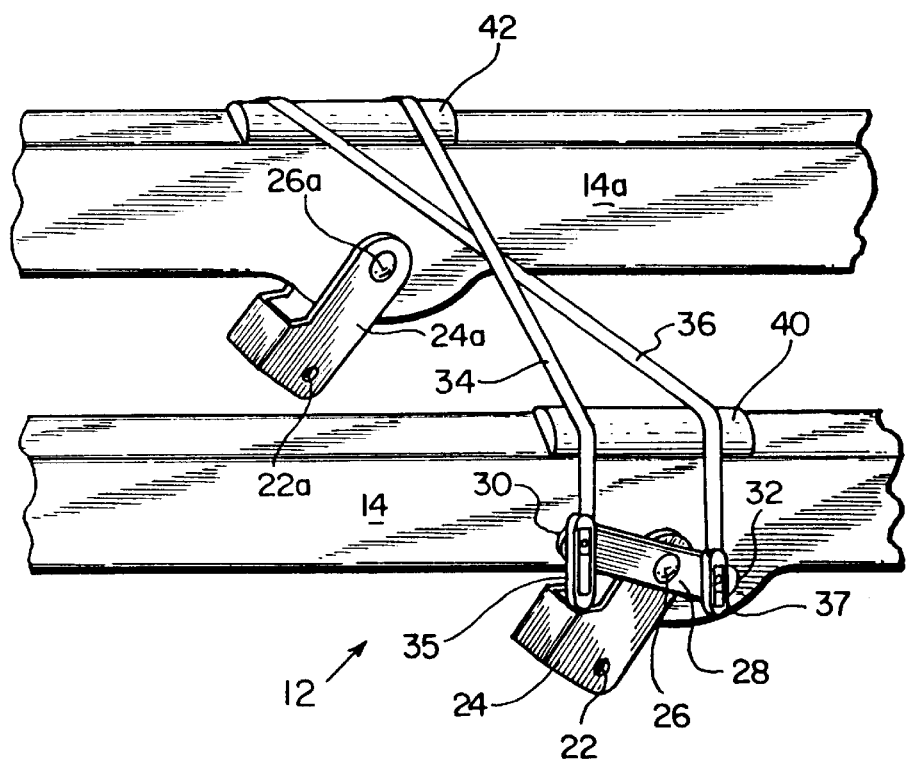
FIG. 2 is a partial perspective view illustrating further details of the stabilizer system of the invention.

Referring to FIG. 2, a second similar shackle 24a is utilized at the opposite side of the vehicle to mount one end of second leaf spring (not shown) in the same fashion as described and illustrated above with respect to the leaf spring 16. The shackle 24a is of similar construction to the shackle 24, with the like parts thereof being designated by like reference numerals with the suffix "a". The second shackle 24a is pivotally mounted at a pivot point 26a to a second vehicle frame member 14a whose structure and function is substantially identical to that of frame member 14, but which is located on the opposite side of the vehicle from frame member 14. Thus, for example, in the illustrated embodiment the frame member 14 and associated components are located on the right-hand side of the vehicle, while the frame member 14a and associated components are located on the left-hand side of the vehicle. A second elongate arm (not shown), substantially identical to arm 28, is mounted to the shackle 24a in the same off-center or offset fashion transversely of the shackle 24a, as described above for the arm 28 and shackle 24.

In accordance with the invention, the opposite end of the first strap 34, whose first end was coupled with the longer one end 30 of the elongate arm 28, is coupled with the opposite or shorter end of the second elongate arm (not shown) which is attached to the shackle 24a. Similarly, the opposite end of strap 36, whose first end was coupled with the second or opposite end 32 of elongate arm 28, is coupled with the longer end of the elongate arm which is attached to the shackle 24a. Thus, the two straps 34, 36 cross each other at a point substantially midway between their connections with the respective arms. In this regard, both straps 34, 36 pass up and over the respective vehicle frame members 14 and 14a. In the illustrated embodiment, respective pads or cushions 40, 42 are placed over upper edge parts of the frame members 14 and 14a so as to cushion or protect the respective straps 34 and 36 as they pass thereover. This will lessen both the bend radius and the friction experienced by the straps 34, 36 as they move transversely relative to the respective frame members 14, 14a in operation, as will be presently described.

Referring to FIGS. 2 and 3, the operation of the stabilizer system of the invention is illustrated in the case of maximum vehicle payload. In this situation, it will be noted that both shackles 24, 24a will be pivoted toward the rear of the vehicle, since the leaf springs will be in a relatively flattened condition with the frame members 14, 14a, pressed downward relative to the axle 18 by virtue of the presence of the maximum payload in the vehicle. In this condition, it will be appreciated that the relatively longer and (for example, 30) of each arm (for example 28) will be raised in the vertical direction by an amount in excess of the amount by which the shorter arms (for example 32) will be lowered in the vertical direction. Hence, the respective straps 34, 36 will be slackened, thus delivering no tension forces to the respective arms.

The effective length of the straps 34, 36 and coupling structures 35, 37 is such that in the maximum payload condition, the straps will not even be placed under tension by vehicle body roll, braking, turning, or the like. Therefore, in a maximum payload condition the stabilizer system of the invention will allow the vehicle design parameters to control vehicle handling. This is desirable for light trucks and similar vehicles which are designed for optimum handling characteristics, and usually for a predetermined amount of understeer condition, in a maximum payload situation.

Figure 4:
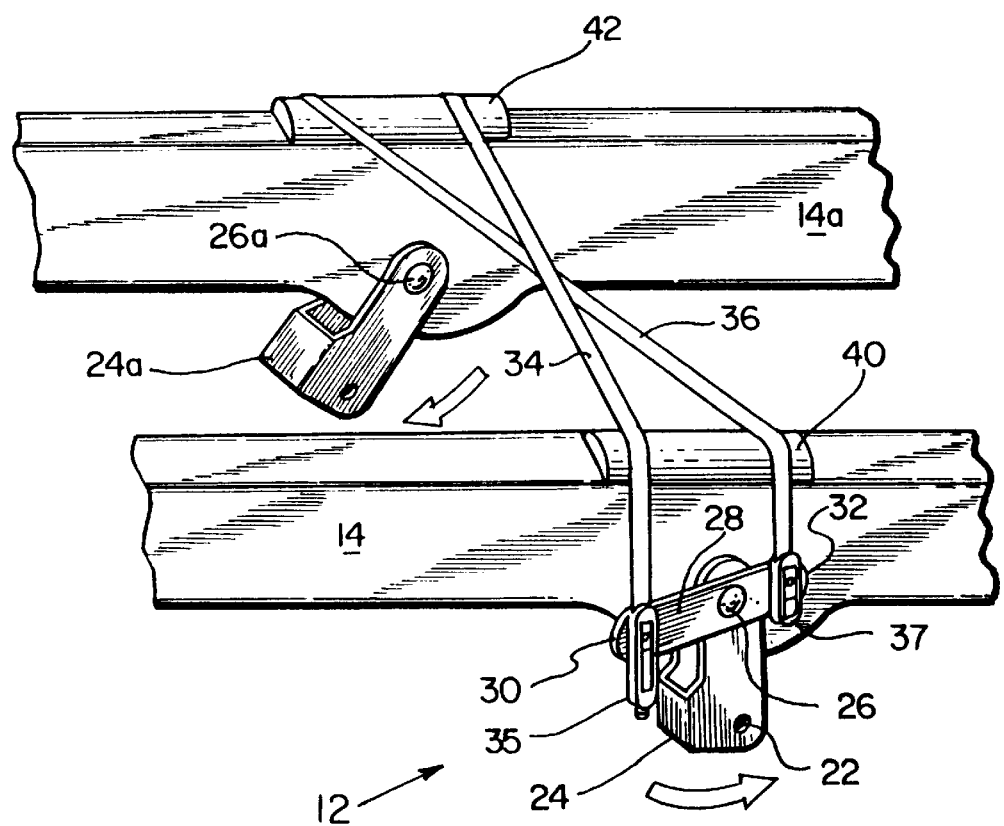
FIG. 4 is a perspective view similar to FIG. 2 showing operation of the system of the invention during a right turn.

FIGS. 4–6, and the following description thereof, are directed to the operation of the vehicle in an unloaded condition. Referring next to FIG. 4, the response of the stabilizer system of the invention to a right turn by the vehicle is illustrated. During a right turn, the weight of the vehicle will tend to be transferred somewhat from the right-hand side to the left-hand side. Accordingly, the shackle 24a on the left-hand side will tend to rotate toward the rear of the vehicle, while the shackle 12 on the right-hand side will tend to rotate toward the front of the vehicle.

In this condition, it will be seen that the strap 34 will be placed under tension due to the rotation of the longer arm 30 of shackle 28 in a generally vertical downward direction. The vertical movement of this longer arm 30 in the downward direction, as well as the downward movement of the shorter arm (not shown) of the shackle 24a, will impart tension to the strap 34. On the other hand, both the shorter end 32 of arm 28 and the longer end of the arm attached to the shackle 24a will rotate upwardly in the vertical direction somewhat, thus, both contributing to slackening of the strap 36.

Accordingly, during a right turn, the tension on the strap 34 will tend to exert a force opposite to the rotational forces acting on the respective shackles 24 and 24a. This tends to return the vehicle to a condition of more evenly distributed weight with respect to the frame members 14, 14a and the suspension elements coupled thereto.

It will be appreciated that in the opposite situation, that is, during a left-hand turn, the opposite will occur with respect to the shackles 24, 24a, with left shackle 24a rotating forwardly and shackle 24 rotating rearwardly. Thus, in this condition, the strap 36 will be tensioned and the strap 34 will be slackened. This will tend to impart tensioning forces to the shackles 24, 24a, in a direction for rotating them in the opposite directions, that is, rotating the right-hand shackle 24 back toward the forward direction and the left-hand shackle 24a back toward the rearward direction so as to thus redistribute the forces on the vehicle suspension.

FIGS. 5 and 6 illustrate the response of the stabilizer system of the invention for providing anti-lift control, for example, in the case of rapid braking of the vehicle, which would tend to transfer weight from the rear of the vehicle to the front of the vehicle. This "lift" condition of the vehicle tends to transfer weight away from the rear wheels and toward the front wheels of the vehicle. In this situation, the weight over the axle 18 would be decreased, tending to make the leaf springs 16 flex downwardly, thus pulling both shackles 24 and 24a forwardly, as illustrated in FIG. 5.

In this condition, it will be seen that the relative amount of vertical downward movement of the longer ends (for example, 30) of the arms (for example, 28) exceed the relative vertical upward movement of the shorter ends (for example, 32). Thus, some net tension is imparted to both of the straps 34, 36. This tension will tend to impart a force for rotating the arms back in the rearward direction. Thus, some anti-lift control (relative to the rear end, which "lifts" as the front end "dives") is provided by the stabilizer system of the invention, tending to return the shackles 24, 24a and thus the suspension and overall vehicle weight distribution to its state preceding the rapid braking or other movement leading to the front end dive condition. Hence, the system of the invention automatically operates to provide some measure of anti-lift control in this situation.

It will be understood that, with the vehicle in a partially loaded condition, that is, somewhere between unloaded and full payload, the tensioning of the straps 34, 36 will begin to occur at some intermediate point in response to body roll or diving. That is, the tensioning will not occur as rapidly as in the unloaded condition, but some tensioning will occur eventually, as body roll or diving increases, until the point at which a full payload condition exists, at which point no tensioning will occur.

Referring to FIGS. 3, 6 and 7, the coupling mechanisms or assemblies 35, 37 of the illustrated embodiment will be described in further detail. The assembly 35 includes a frame-like housing member 50 which has a hollow interior portion 52. This hollow interior portion 52 houses a slider component 54 which is attached by suitable fastener such as a screw 56 to an associated end 30 or 32 of one of the arms 28. A top portion of the housing 50 has a slot 58 which receives a metal coupling piece 60 which is affixed preferably by welding to an associated one of the straps 32, 34. The majority of the remaining portion of the hollow interior 52 of the housing 50 is taken up by an elastomeric compressible element 62, preferably formed of a relatively hard rubber or synthetic material. Thus, as the associated strap 32 or 34 is placed in tension, the housing 50 will be pulled upwardly, tending to compress the compressible member 62 intermediate a bottom edge of the housing 50 and the slider member 54, which is slidably mounted relative to the interior 52 of the housing 50.

The assembly 37 is substantially identical to the assembly 35 insofar as the parts thus far described. Therefore, the like parts of assembly 37 are designated by like reference numerals with the suffix b. However, the assembly 37 will be seen to be somewhat smaller than the assembly 35.

An additional pre-tensioning adjustment screw 64 is provided in the assembly 35 extending through a mating threaded opening in the bottom portion of the housing 50. This screw 64 bears against a plate 66 for adding a predetermined amount of compression or pre-loading to the elastomeric compressible member 62.

From the foregoing, it will be seen that the stabilizer system of the preferred form of the invention is particularly advantageous in that it is dependent on vehicle payload. As illustrated, for example, in FIGS. 2 and 3, this system has no effect on the vehicle in a maximum payload condition, but comes into play with lessened payload, or during turning or for anti-lift control. Most advantageously, the stabilizer system of the invention tends to exert forces on the vehicle suspension which would return the suspension to an equilibrium condition during various maneuvers or handling conditions of the vehicle. As mentioned above, if the arms 28 are mounted in a condition which is centered relative to pivot points 26, such that their ends 30, 32 are equidistant from the pivot point 26, the system functions as a stabilizer, but is not payload dependent.

As a further advantage, it will be appreciated that the components of the stabilizer system of the invention add relatively little additional weight to a vehicle. These components include the straps 34, 36, the connecting assemblies 35 and the arms 28, which are attached to the shackles 24, 24a. These parts are relatively few and relatively light in weight. Thus, it is estimated that these components in accordance with the invention might add approximately 6 lbs. to the total vehicle weight, as compared to conventional stabilizer bars or anti-roll bars which may weigh approximately 20 to 25 lbs.

While particular embodiments of the invention have been shown and described in detail, it will be obvious to those skilled in the art that changes and modifications of the present invention, in its various aspects, may be made without departing from the invention in its broader aspect, some of such changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. An improved shackle for a stabilizer system for an automotive vehicle, comprising:
   an elongate body having first and second pivot means defined within first and second opposite ends thereof for pivotal connection to a vehicle frame member and a vehicle leaf spring, respectively; and
   an elongate arm rigidly connected to said elongate body at a connection point and extending transversely thereof.

2. The shackle as set forth in claim 1, wherein:
   said first pivot means defined within said first end of said elongate body has its pivotal axis thereof passing through said elongate arm.

3. The shackle as set forth in claim 1, wherein:
   said elongate arm is mounted upon said elongate body in an off-centered manner with respect to said elongate body such that a first end of said elongate arm is disposed further away from said connection point than a second opposite end of said elongate arm with respect to said connection point.

4. The shackle as set forth in claim 2, wherein:
   said elongate arm is mounted upon said elongate body in an off-centered manner with respect to said elongate body such that a first end of said elongate arm is disposed further away from said first pivot means than a second opposite end of said elongate arm with respect to said first pivot means.

5. The shackle as set forth in claim 1, wherein:
   said elongate body has a clevis configuration such that opposite sides of said first end thereof can engage opposite side surfaces of a vehicle frame member.

6. The shackle as set forth in claim 1, wherein:
   said elongate arm comprises first and second opposite ends disposed remote from said connection point with said elongate body; and
   said first and second pivot means are defined within said first and second opposite ends of said elongate arm for pivotal connection to first and second tensioning means of a vehicle stabilizer system.

7. The shackle as set forth in claim 1, wherein:
   said elongate body has a longitudinal extent along which a longitudinal axis extends between said first and second pivot means; and
   said elongate arm, extending transversely with respect to said elongate body, is disposed at an angle with respect to said longitudinal axis of said elongate body which is other than 90 degrees.

8. An improved shackle for a stabilizer system for an automotive vehicle, comprising:
   an elongate body having first and second pivot means defined within first and second opposite ends thereof for pivotal connection to a vehicle frame member and a vehicle leaf spring, respectively; and
   an elongate arm fixedly connected to said elongate body at a connection point and extending transversely thereof.

9. The shackle as set forth in claim 8, wherein:
   said first pivot means defined within said first end of said elongate body has its pivotal axis thereof passing through said elongate arm.

10. The shackle as set forth in claim 8, wherein:
    said elongate arm is mounted upon said elongate body in an off-centered manner with respect to said elongate body such that a first end of said elongate arm is disposed further away from said connection point than a second opposite end of said elongate arm with respect to said connection point.

11. The shackle as set forth in claim 9, wherein:
    said elongate arm is mounted upon said elongate body in an off-centered manner with respect to said elongate body such that a first end of said elongate arm is disposed further away from said first pivot means than a second opposite end of said elongate arm with respect to said first pivot means.

12. The shackle as set forth in claim 8, wherein:
    said elongate body has a clevis configuration such that opposite sides of said first end thereof can engage opposite side surfaces of a vehicle frame member.

13. The shackle as set forth in claim 8, wherein:

said elongate arm comprises first and second opposite ends disposed remote from said connection point with said elongate body; and said first and second pivot means are defined within said first and second opposite ends of said elongate arm for pivotal connection to first and second tensioning means of a vehicle stabilizer system.

14. The shackle as set forth in claim 8, wherein:

said elongate body has a longitudinal extent along which a longitudinal axis extends between said first and second pivot means; and said elongate arm, extending transversely with respect to said elongate body, is disposed at an angle with respect to said longitudinal axis of said elongate body which is other than 90 degrees.

15. The shackle as set forth in claim 7, wherein:

said connection point at which said elongate arm is fixedly connected to said elongate body, and said pivotal axis of said first pivot means at which said elongate body is pivotally connected to said vehicle frame member, are coincident.

16. An improved shackle for a stabilizer system for an automotive vehicle, comprising:

an elongate body having first and second pivot means defined within first and second opposite ends thereof for pivotal connection to a vehicle frame member and a vehicle leaf spring respectively; and an elongate arm rigidly connected to said elongate body at a connection point, extending transversely with respect to said elongate body, located closer to one of said first and second pivot means than the other one of said first and second pivot means, and oriented off-center with respect to said one of said first and second pivot means such that a first end of said elongate arm extends further from said connection point than a second end of said elongate arm which is disposed opposite said first end of said elongate arm.

17. The shackle as set forth in claim 16, wherein:

said first pivot means defined within said first end of said elongate body has its pivotal axis thereof passing through said elongate arm.

18. The shackle as set forth in claim 17, wherein:

said connection point at which said elongate arm is fixedly connected to said elongate body, and said pivotal axis of said first pivot means at which said elongate body is pivotally connected to said vehicle frame member, are coincident.

19. The shackle as set forth in claim 16, wherein:

said elongate body has a clevis configuration such that opposite sides of said first end thereof can engage opposite side surfaces of a vehicle frame member.

20. The shackle as set forth in claim 16, wherein:

said elongate arm comprises first and second opposite ends disposed remote from said connection point with said elongate body; and said first and second pivot means are defined within said first and second opposite ends of said elongate arm for pivotal connection to first and second tensioning means of a vehicle stabilizer system.

21. The shackle as set forth in claim 16, wherein:

said elongate body has a longitudinal extent along which a longitudinal axis extends between said first and second pivot means; and said elongate arm, extending transversely with respect to said elongate body, is disposed at an angle with respect to said longitudinal axis of said elongate body which is other than 90 degrees.

* * * * *